April 10, 1951

A. L. WEISBECKER 2,548,276

VOLTAGE AND PHASE MEASURING
CATHODE-RAY OSCILLOSCOPE

Filed July 9, 1948

Inventor
August L. Weisbecker
By
Attorney

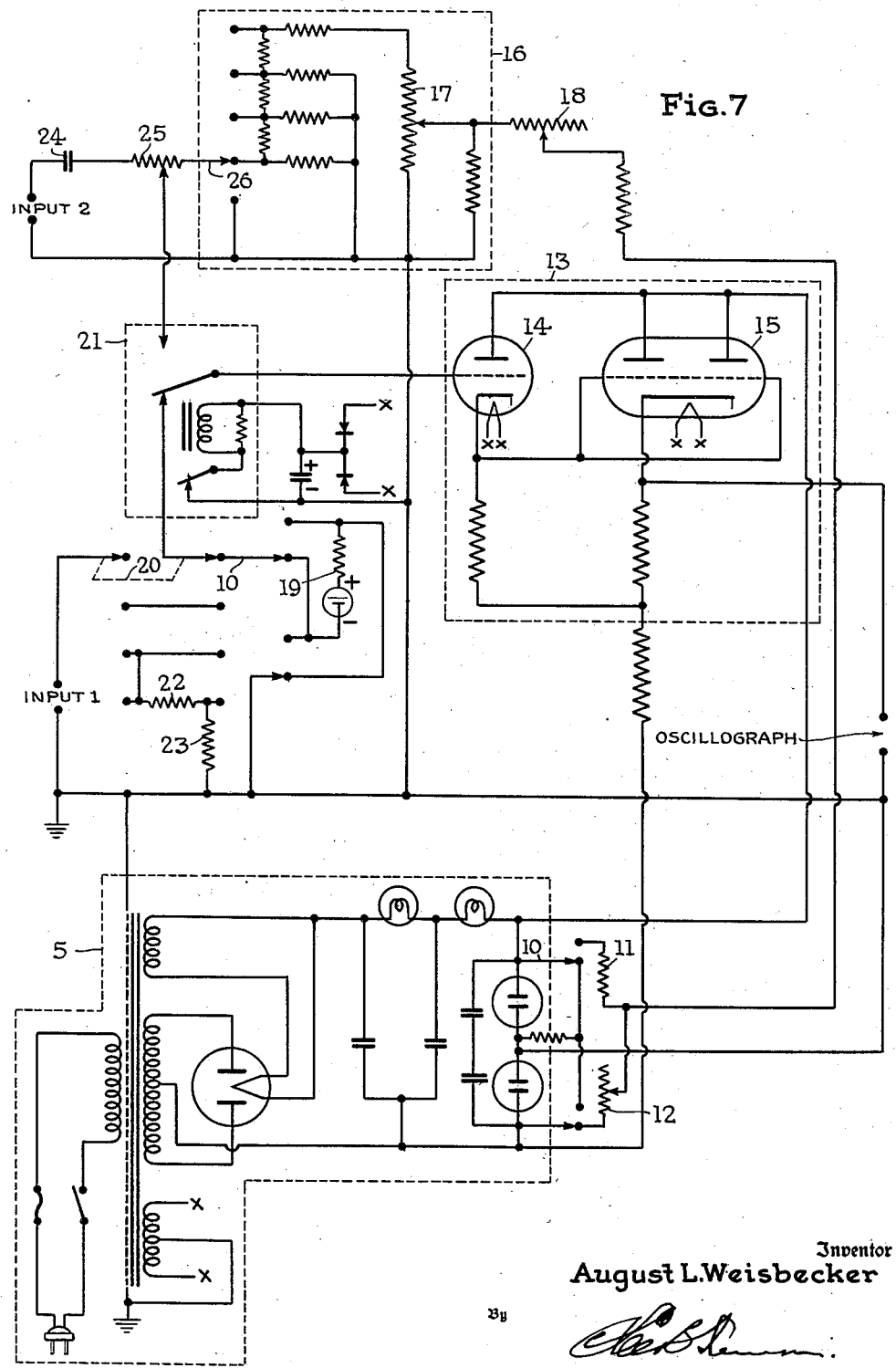

Patented Apr. 10, 1951

2,548,276

UNITED STATES PATENT OFFICE 2,548,276

VOLTAGE AND PHASE MEASURING CATHODE-RAY OSCILLOSCOPE

August L. Weisbecker, Williamstown, N. J.

Application July 9, 1948, Serial No. 37,880

9 Claims. (Cl. 172—245)

The present invention relates to electric circuit arrangements and apparatus for use in conjunction with cathode ray oscilloscopes. More particularly it relates to a new and useful instrumentality for measuring electrical characteristics and/or values of voltages which may be viewed on the screen of a cathode-ray oscilloscope.

Heretofore, it has been known to employ physical scales and the like in conjunction with a cathode ray oscilloscope to obtain an indication of the value or characteristics of a voltage under examination. Measurements made with such apparatus are necessarily crude, and also of narrow range. It has also been proposed to provide a power supply with a calibrated square wave output for use as a comparison device in conjunction with the aforementioned scales. The limitation of such measuring methods are apparent. My invention serves a longfelt need for a wide range, accurate, direct-reading measuring instrument, for use in conjunction with a cathode ray oscilloscope.

The main objects of my invention may be set forth as follows: to open new fields for oscilloscope applications; to dispense with physical datum lines, scales, or measuring screens; to provide accurate, direct reading measuring means for any voltage or portion thereof, which may be viewed on the oscilloscope; to extend the low frequency response of the oscilloscope to zero; to provide infinite impedance measuring means of both A. C. and D. C. voltages with exceptional accuracy; to provide means for the measurement of phase angle displacements; and to incorporate all of the above means in a small and compact apparatus which can be manufactured at reasonably low cost.

The apparatus comprising this invention may be used with practically any of the ordinary cathode ray oscilloscopes now on the market. Further it may be either made an integral part of such oscilloscopes, or it may be manufactured as a compact separate instrument for use in conjunction with the ordinary type of oscilloscope which does not incorporate its features.

Basically, my apparatus consists of a cathode follower circuit, which will hereinafter be more accurately described; a power supply circuit; a voltage divider and potentiometer; switching means for feeding the cathode follower alternately with a voltage whose electrical characteristics and/or values are to be measured and a known standard voltage which is continuously variable.

The said switching means is an important element in the operation of this instrument, and a preferred form of this device is to be found in my copending application Serial Number 48,069 filed September 7, 1948.

The essential characteristics of its operation, however, are a switching rate sufficiently above the low frequency cut-off of the oscilloscope, with which the device is being used, that no errors will be introduced due to attenuation or distortion by the oscilloscope of the signal fed to it, and a very short switching interval, preferably of the order of less than 50 micro-seconds.

The cathode follower circuit embodied in my invention has the purpose of providing an infinite impedance input to preclude any loading effects on the voltage under test, thus greatly increasing the inherent accuracy of any measurements made. By way of a concrete example, the grid current drawn by this circuit may be actually less than .001 micro-ampere, with an output impedance of the order of 150 ohms.

The voltage divider circuit is made up entirely of linear resistance elements, but its voltage output characteristic varies with potentiometer settings in a quasi-logarithmic manner. The accuracy of all measurements, therefore, is a fixed percentage of any scale reading.

My invention can best be described with reference to the accompanying drawings, in which.

Figure 3:
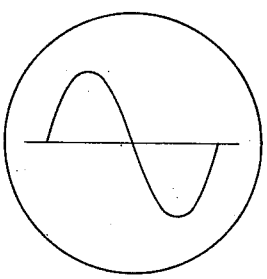
Figure 3 is an oscillogram showing a sine wave voltage input with the voltage divider circuit set at zero.
Figure 4:
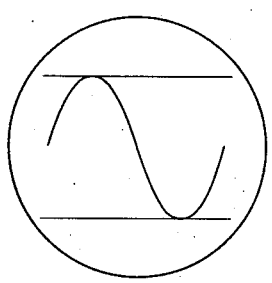

Figure 4 is like Figure 3, except that the potentiometer has now been rotated to match the peak voltage of the input wave with the voltage output of the voltage divider circuit. As shown in this figure, either the positive or negative peak of the wave may be measured. This is accomplished by a simple polarity switch.

Figure 5:
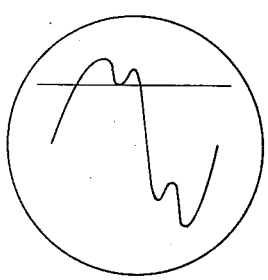

Figure 5 is an oscillogram showing an irregular wave shape input and the direct current voltage line placed to indicate the value at which an irregularity occurs.

Figure 6:
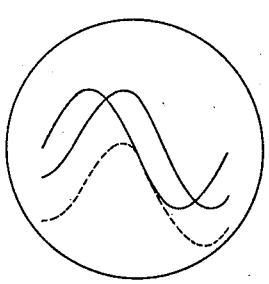

Figure 6 is an oscillogram showing the pattern obtained when measuring phase angles.

Figure 7 is a complete wiring diagram for a preferred embodiment of the invention.

The basic operation of my device can best be explained with reference to the simplified block diagram shown in Figure 1 and the oscillograms shown in Figures 2, 3, 4, and 5.

Figure 1:
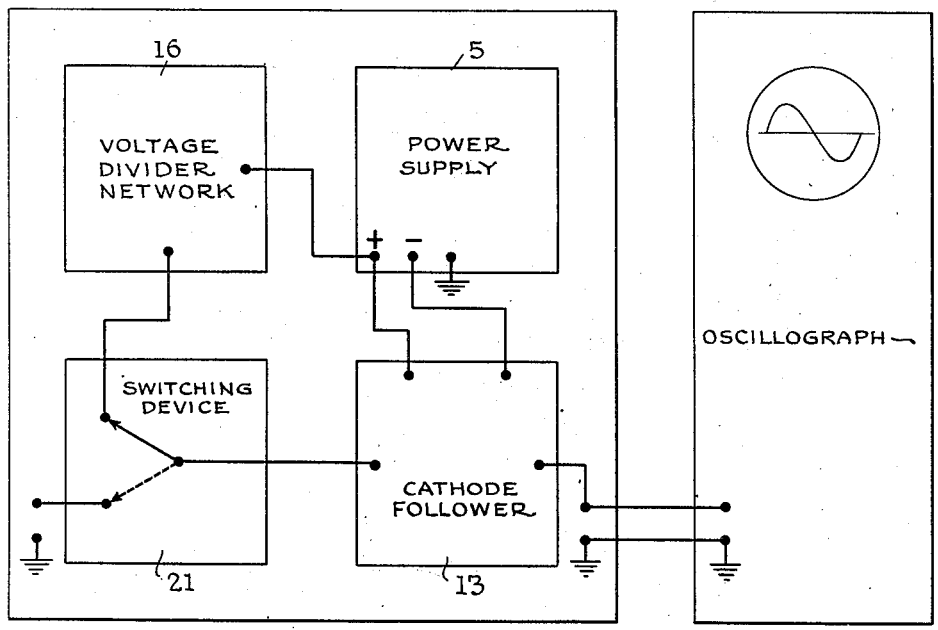
Figure 1 is a simplified block diagram of the apparatus set up for the measurement of electric potentials.
Figure 2:
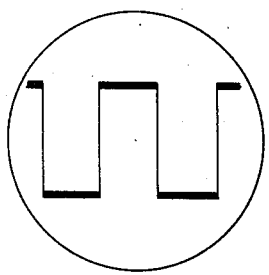
Figure 2 is an oscillogram showing the pattern obtained with zero input (lower horizontal line), but with some direct current voltage being connected to the other side of the switching device from the voltage divider circuit (upper horizontal line).

Any voltage, the value of which is to be measured is to be connected to the input terminals shown at the lower left hand side of Figure 1. When the arm of the switching device 21 is in its lower position, this unknown voltage is connected to the input of the cathode follower 13. Since the latter circuit draws an essentially infinitesimal grid current, the load on the source of voltage under measurement is so small as to be negligible. The power supply 5, in addition to providing operating potentials for the cathode follower, also supplies a voltage to a resistor network which serves as a voltage divider 16. This network includes a potentiometer, by means of which the output of the voltage divider is made continuously variable. When the arm of the switching device 21 is in the upper position, shown in Figure 1, the output of the voltage divider 16 is connected to the input of the cathode follower 13. The switching device 21 preferably operates at a frequency, or switching rate, which is above the low frequency cutoff of the oscillograph being used. In addition, the time between the breaking of one contact and the making of the other, should be extremely short. The oscillogram of Figure 2 shows scope representation of the operation of the switching device with no voltage applied to the input of the instrument and with the voltage divider 16 set at some intermediate value so that an unbalanced condition results. The degree of unbalance, of course, is proportional to the vertical distance between the top and bottom lines of the square wave pattern. Figure 3 shows the oscillogram obtained when the voltage divider 16 is set, by means of the aforementioned potentiometer, for zero voltage output and a sine wave source of voltage is connected to the input terminals of the instrument. The horizontal line appearing through the zero axis of the sine wave, therefore, is caused by the sweep voltage of the oscilloscope itself. By varying the output of the voltage divider 16, this horizontal line may be moved, in a vertical direction, relative to the sine wave voltage undergoing measurement, and thus becomes an electrical datum line the ordinate of which is always proportional to the voltage output of the voltage divider 16. Figure 4 shows an oscillogram like that shown in Figure 3, except that the voltage output of the voltage divider 16 has been increased by means of the potentiometer so that the ordinate of the datum line is the same as the peak potential of the applied sine wave voltage. By means of a polarity switch, adapted to connect the voltage divider to either the positive or negative side of the power supply 5, either the positive or negative peak of the applied sine wave voltage may be matched by the electrical datum line. If there is a distortion or irregularity of any kind in the sine wave voltage, the ordinate at which it occurs may also be matched with the electrical datum line as shown in the oscillogram of Figure 5. Since the ordinate of the horizontal electrical datum line is always proportional to the deflecting voltage applied to the oscilloscope, registry between this line and any portion of the voltage under measurement provides a means for measuring the unknown voltage at the point of registry.

From the foregoing, it will be apparent, that if the voltage divider 16 is properly calibrated with a graduated scale of voltages, instantaneous readings may be made of the value at any time of a source of voltage applied to the input of the instrument. It will also be apparent that the range of the instrument can be made as large as desired by suitable attenuation or divider circuits connected to the input terminals, with no changes to the voltage divider circuit. Thus a known accurate division of an unknown voltage may be applied to the cathode follower and balanced by the electrical datum line.

Thus far, my invention has been described only as a potential measuring device. However, it may also be used to measure phase angles. Phase angle measurement can best be described with reference to Figure 7. As can easily be seen, input 1 of this figure corresponds to the input shown in the block diagram of Figure 1. Input 2 of Figure 7 comprises a second pair of input terminals connected to the same pole of the switching device as is the voltage divider network. Any alternating current voltage applied to these terminals is, therefore, superimposed on the direct current voltage output of the voltage divider. Varying the output of the voltage divider, therefore, causes displacement in a vertical direction of the oscillographic trace of the voltage applied to these terminals. If it is desired to measure the phase shift produced by any electrical network or device such, for example, as a transformer, an attenuation network, an amplifier, etc., this may be done in the following manner. The input voltage, to the device producing the phase shift in question, is connected to input 1 of my instrument. The output voltage of this same device is connected to input 2 of my instrument. There then appears on the oscilloscope screen, an oscillogram as shown by the two solid lines of Figure 6. By suitable attenuation means, the amplitudes of the two traces may be balanced. Then the trace corresponding to the voltage applied to input 2 can be displaced in a vertical direction with respect to the voltage applied to input 1 by varying the direct current voltage output of the voltage divider. Such a displacement may be effected by this means that a tangent relation between the two traces is established. The dotted line shown in the oscillogram in Figure 6 shows this relation. Having first measured, as previously described, the peak potential of the two waves, the following equation yields the desired phase angle:

$$V = 2E \sin \theta/2$$

where

V = potentiometer reading (corresponding to tangency)
E = peak potential of the waves
$\theta$ = phase angle displacement.

To facilitate rapid evaluation of the phase angle, I find it convenient to plot a graph of V/2E vs. phase angle in degrees.

To describe in detail the various elements of my invention, I do so with reference to a preferred embodiment thereof, shown in Figure 7.

The power supply 5 shown at the bottom of the sheet is conventional and of a type well known to the art. It forms no part of the present invention and a detailed description thereof is believed unnecessary. Polarity switch 10 provides for connecting either the positive or negative side of the power supply to the voltage divider network. Fixed resistor 11 and potentiometer 12 are provided to compensate for any irregularities between the two voltage regulator tubes of the power supply unit. Potentiometer 12 is primarily a factory adjustment and need not be changed unless the voltage regulator tubes are replaced.

A preferred embodiment of the cathode follower circuit 13 includes a triode 14 and a duo-triode 15 such as a 6C4 and a 6J6. With these tubes connected as shown, it is possible to have less than .001 micro-ampere grid current. Note that no ground connection is used, but that this circuit is floated between the positive and negative supply lines. The cathode of the first tube 14 is driven by the cathode of the second tube 15. The net result is a wide frequency response at a high voltage level even though the current amplifiacation factor is high.

The voltage divider network 16 is composed entirely of linear type resistors. The potentiometer 17 is also linear. By the configuration shown, however, the variation in output voltage with rotation of the potentiometer is a quasi-logarithmic function. The dial of potentiometer 17, therefore, is calibrated in a quasi-logarithmic scale of voltages. Potentiometer 18 is a front panel adjustment for the purpose of regulating the amount of current flowing through the voltage divider. For convenience in calibrating the voltage divider, I provide within the instrument a standard cell 19. It will be apparent that any other accurate known voltage could be externally connected for the same purpose. With the input switch 20 in the position shown, the voltage from cell 19 will be connected to the deflecting circuit of the oscillograph through the cathode follower 13, alternately with the voltage from the calibrated voltage divider network 16 by means of switching device 21. Since the voltage of standard cell 19 is a fixed and known quantity, the voltage divider network 16 may then be accurately calibrated by varying potentiometer 18 until the oscillogram shown in Figure 2 becomes a straight horizontal line, instead of the square wave as shown. Potentiometer 17 must, of course, be set at the voltage calibration corresponding to the E. M. F. of standard cell 19. Input switch 20 is shown as a four position switch with one pair of terminals reserved for standard cell 19. In the next position, switch 20 provides a direct connection from input 1 to the cathode follower. The input impedance in this case is practically infinity. The remaining two positions on the switch provide a constant input impedance less than infinity by virtue of resistors 22 and 23. The purpose of these resistors is to provide a high impedance voltage divider to extend the range of the instrument beyond that afforded by the voltage divider network alone and also to provide a high resistance direct current return. It should be apparent that switch 20 may be provided with any number of terminals for accommodating additional divider networks in order to provide for any desired range of the instrument.

Condenser 24 in input 2 is a blocking condenser to prevent any direct current voltage components from reaching the voltage divider network.

Potentiometer 25 serves as an attenuator for balancing amplitudes, when making phase angle measurements as hereinbefore described.

Switch 26 is connected as an output voltage multiplier and it will be apparent that circuit configuration other than that shown could be used to produce a similar result.

I prefer to calibrate, in addition to the dial of potentiometer 17, the various positions of the two multiplier switches 20 and 26. When the electrical datum line is then placed in proper relationship to the unknown voltage applied to the input terminals, its voltage may be read directly as the product of the three calibrations.

It will be apparent to those skilled in the art that only one embodiment of my invention has been illustrated and described herein. Many minor variations in the circuit are possible to yield the same result and still be within the scope of the following claims.

I claim:

1. A device, for use in conjunction with a cathode ray oscilloscope for measuring electric potentials, comprising: a two pole switching device having a switching rate of at least 10 times the low frequency cut-off of the oscilloscope and a switching interval less than 50 micro-seconds; a variable calibrated voltage divider circuit the output of which is connected to one pole of said switching device and the input of which is connected to a stable direct current voltage source input means for connecting a voltage to be measured to the other pole of said switching device; output means including a cathode-follower for connecting the output terminal of said switching device to one deflecting circuit of said oscilloscope; means including a potentiometer for continuously varying the output of the voltage divider so that registry can be obtained between any part of an oscillographic trace of the voltage undergoing measurement and an oscillographic trace of the direct current voltage output of said voltage divider.

2. A device as defined by claim 1 in which a variable resistor is placed in series with the voltage divider circuit for varying the flow of direct current therethrough, whereby the output of said voltage divider may be calibrated at any time against a known standard voltage.

3. Apparatus to be used in conjunction with a cathode ray oscilloscope for measuring an A. C. or D. C. voltage, comprising in combination: means adapted to produce simultaneously traces of an unknown voltage and a known direct current voltage on the screen of said oscilloscope, said means including an automatic switch of high switching rate and having at least two input terminals, one each for said known and unknown voltages, an output terminal, and a cathode follower having its input connected to said output terminal and its output connected to one deflection circuit of said oscilloscope; a stable source of D. C. voltage; a voltage reducing circuit connected between said source and one of said switch input terminals and including a calibrated, substantially continuously variable resistance, whereby said known direct current voltage trace may be made to coincide with any portion of a trace of said unknown voltage connected to said second input terminal to determine the potential thereof.

4. An A. C.-D. C. voltage measuring device to be used in conjunction with a cathode ray oscilloscope, comprising in combination: automatic switching means characterized by a switching rate of the order of 100 cycles per second, a switching interval less than about 50 microseconds and having at least first and second input terminals and an output terminal; means affording connection of an unknown voltage to said first input terminal; a stable source of D. C. voltage; a voltage reducing circuit connected to said source and including a calibrated substantially continuously variable resistance; means connecting the output of said circuit to said second switch input terminal; and means including a cathode follower connecting said output terminal to one deflection circuit of said oscilloscope, whereby a known direct current reference voltage trace may be superimposed on a trace of said unknown voltage and by means of said variable resistance may be matched to any portion thereof to determine the potential of said unknown voltage.

5. An A. C.-D. C. voltage measuring device to be used in conjunction with a cathode ray oscilloscope, comprising in combination: automatic switching means characterized by a switching rate of the order of 100 cycles per second, a switching interval less than about 50 microseconds and having at least first and second input terminals and an output terminal; means affording connection of an unknown voltage to said first input terminal; a regulated electronic power supply providing a source of D. C. voltage; a resistive network connected to said source and including a calibrated potentiometer; means connecting the output of said potentiometer to said second switch input terminal; and means including a cathode follower connecting said output terminal to one deflection circuit of said oscilloscope, whereby a known D. C. reference voltage trace may be superimposed on a trace of said unknown voltage and by means of said variable resistance may be made to coincide therewith in order to determine the potential of any portion of said unknown voltage.

6. A device as defined by claim 4 and including a calibrated voltage divider circuit affording direct or calibrated attenuated connection of said unknown voltage to said first switch input terminal, whereby the amplitude of the trace of the unknown voltage may be adjusted to a value within the range of control of said D. C. voltage trace afforded by said calibrated variable resistance.

7. A device as defined by claim 4 which includes a standard cell, and a switch, adapted to connect said standard cell to said first input terminal whereby said variable resistance may be calibrated against the voltage of said standard cell.

8. A device as defined by claim 5 in which said power supply is connected to furnish substantially equal positive and negative voltages and includes a polarity switch connected between the output of said power supply and said resistive network whereby said direct current reference voltage trace may be adjusted with respect to said unknown voltage trace by means of said calibrated potentiometer in both positive and negative directions to determine the potential of said unknown voltage.

9. A phase angle measuring device to be used in conjunction with a cathode ray oscilloscope, comprising in combination: automatic switching means characterized by a switching rate of the order of 100 cycles per second, a switching interval less than about 50 microseconds and having at least first and second input terminals and an output terminal; means affording connection of a sine wave voltage to said first terminal; a regulated electronic power supply providing a source of direct current voltage; a resistive network connected to said source and including a calibrated potentiometer; means connecting the output of said potentiometer to said second switch input terminal; means including a D. C. blocking condenser and an attenuator affording connection of a second sine wave voltage displaced in phase from said first sine wave voltage to said second input terminal; means including a cathode follower connecting said output terminal to one deflection circuit of said oscilloscope, whereby oscillographic traces of said sine wave voltages are made to appear simultaneously on said oscilloscope; and means including said potentiometer for displacing the trace of said second voltage with respect to the trace of said first voltage to fix a point of tangency between the two traces to indicate the phase angle therebetween.

AUGUST L. WEISBECKER.

REFERENCES CITED

The following references are of record in the file of this patent:

UNITED STATES PATENTS

| Number | Name | Date |
| --- | --- | --- |
| 1,939,434 | Busse | Dec. 12, 1933 |
| 2,089,430 | Roys et al. | Aug. 10, 1937 |
| 2,122,499 | Stocker | July 5, 1938 |
| 2,283,951 | Ripley | May 26, 1942 |
| 2,293,135 | Hallmark | Aug. 18, 1942 |

OTHER REFERENCES

The Oscillographer: article by Mezger; pages 1, 2 and 3, March-April 1947, vol. 9, No. 2 (copy in Div. 69) 171–95–6A3.

Proceedings of the Institute of Radio Engineers: article by A. C. Stocker; pages 1019, 1020 and 1023, August 1937, vol. 25, No. 8. 171–95–6A.

Oscillographer: Article by T. T. Goldsmith, Jr.; pages 1–5, Aug.-Sept. 1939, volume 3, Nos. 6 and 7 (copy in Div. 10) 250–27C.